(12) United States Patent
Larsen

(10) Patent No.: US 9,179,430 B2
(45) Date of Patent: Nov. 3, 2015

(54) PN SELECTION FOR RF REPEATERS, BI-DIRECTIONAL AMPLIFIERS OR DISTRIBUTED ANTENNA SYSTEMS

(75) Inventor: Tormod Larsen, Geneva, IL (US)

(73) Assignee: EXTENET SYSTEMS, INC., Lisle, IL (US)

( * ) Notice: Subject to any disclaimer, the term of this patent is extended or adjusted under 35 U.S.C. 154(b) by 327 days.

(21) Appl. No.: 13/352,685

(22) Filed: Jan. 18, 2012

(65) Prior Publication Data

US 2013/0182698 A1 Jul. 18, 2013

(51) Int. Cl.
*H04W 56/00* (2009.01)
*H04J 13/00* (2011.01)
*H04W 84/04* (2009.01)

(52) U.S. Cl.
CPC ........ *H04W 56/0045* (2013.01); *H04J 13/0074* (2013.01); *H04W 84/047* (2013.01)

(58) Field of Classification Search
None
See application file for complete search history.

(56) References Cited

U.S. PATENT DOCUMENTS

| | | | | |
|---|---|---|---|---|
| 4,644,523 | A * | 2/1987 | Horwitz | 370/479 |
| 6,049,564 | A * | 4/2000 | Chang | 375/130 |
| 6,366,570 | B1 * | 4/2002 | Bhagalia | 370/342 |
| 6,477,154 | B1 * | 11/2002 | Cheong et al. | 370/328 |
| 7,149,240 | B2 * | 12/2006 | McDonough et al. | 375/146 |
| 2003/0096574 | A1 * | 5/2003 | Anderson et al. | 455/13.2 |
| 2005/0208889 | A1 * | 9/2005 | Baker et al. | 455/7 |
| 2007/0110005 | A1 * | 5/2007 | Jin et al. | 370/335 |
| 2008/0084856 | A1 * | 4/2008 | Ramachandran | 370/342 |
| 2009/0252065 | A1 * | 10/2009 | Zhang et al. | 370/256 |
| 2011/0255501 | A1 * | 10/2011 | Kwon | 370/329 |

OTHER PUBLICATIONS

QUALCOMM White Paper, Relating Search Window Sizes to Fiber Delay in a Repeater, QUALCOMM Engineering Services Group, 2003.

* cited by examiner

*Primary Examiner* — Timothy J Weidner
(74) *Attorney, Agent, or Firm* — McDonnell Boehnen Hulbert & Berghoff LLP

(57) ABSTRACT

Presented herein are methods and systems for providing network access at a slave node based on a signal transmitted by a master BTS. In one example, a pseudorandom code (PN code) selection is described, in which each slave node has a known associated time offset and data is transmitted with a PN code advanced by the known time offset and the propagation delay. Using an example slave base station transceiver architecture (or just slave node for short), the "traditional" BSC can be removed from at least one base station (e.g., "slave nodes") and a master base station may be configured to control the signal being transmitted from each slave node. Each slave node then may transmit and receive RF signals. The master BTS head end may receive signal portions from the slave nodes and mobile devices, and combine them for relay back into the network.

26 Claims, 8 Drawing Sheets

PN SELECTION FOR RF REPEATERS, BI-DIRECTIONAL AMPLIFIERS OR DISTRIBUTED ANTENNA SYSTEMS

BACKGROUND

A wireless communication system typically provides one or more forms of wireless access to mobile access devices, enabling them to engage in voice and data communications with other devices—both wired and wireless—operating in or connected to the system, and to partake in various other communication services provided or supported by the system. The communication path from a mobile access device, such as a cellular telephone, personal digital assistant (PDA), or an appropriately equipped portable computer, for instance, to one or more other communication endpoints generally traverses a radio frequency (RF) air interface to a base transceiver station (BTS) or other form of access point, and on into a core transport network via a base station controller (BSC) connected to a mobile switching center (MSC) or to a packet data serving node (PDSN). The MSC supports primarily circuit voice communications, providing interconnectivity with other MSCs and PSTN switches, for example. The PDSN supports packet data communications, providing interconnectivity with packet-data networks, such as the Internet, via other packet-data switches and routers.

In a cellular wireless system, the BTS and BSC, among possibly other components, comprise the wireless access infrastructure, also sometimes referred to as the radio access network (RAN). A RAN is usually arranged according to a hierarchical architecture, with a distribution of multiple BTSs that provide areas of coverage (e.g., cells) within a geographic region, under the control of a smaller number of BSCs, which in turn are controlled by one or a few regional (e.g., metropolitan area) MSCs. As a mobile device moves about within the wireless system, it may hand off from one cell (or other form of coverage area) to another. Handoff is usually triggered by the RAN as it monitors the operating conditions of the mobile device by way of one or more signal power levels reported by the device to the RAN.

As the demand for wireless services has grown, and the variety of physical environments in which wireless access is provided becomes more diverse, the need for new topologies and technologies for coverage has become increasingly important. Additionally, the increasing prevalence of wireless devices requires an increase in network capacity. However, sometimes network conditions change too rapidly for a physical network build out to occur. Therefore, it may be desirable to have a network than can adapt to changing network conditions. In addition, as wireless access infrastructures of different service providers tend to overlap more and more within smaller spaces, the ability to share common infrastructure offers cost and operational benefits to network owners and operators.

SUMMARY

A particular architectural challenge facing the wireless access infrastructure is to provide dynamic coverage in locations with varying network capacity requirements, and on a relatively fine geographic scale, using equipment that is physically unobtrusive and require limited amount of wired connectivity. One solution to emerge is a pseudorandom code (PN code) selection, which each node has a known associated time offset and data is transmitted with a PN code advanced by a known time offset. The nodes can be deployed so as to provide a dynamic coverage area where deployment of traditional cell towers or traditional DAS (Distributed Antenna System) nodes may be impractical or not permitted. In some examples, a slave base station transceiver architecture (or just slave node for short) can be used in which the master base station may control the PN signal being transmitted from each slave node. One or several slave nodes may then transmit and receive the designated PN and hence provide a dedicated capacity in the designated area(s). These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

The present disclosure will be described by way of example with reference to wireless access technologies including Code Division Multiple Access (CDMA), although the disclosure is not limited to CDMA technologies. CDMA is typically deployed in cellular wireless communication systems, and generally encompasses a number of related technologies that collectively and/or individually support both circuit-cellular communications, including voice and circuit-based packet communications, and native packet-data communications. For the purposes of the discussion herein, a "CDMA family of protocols" may be taken to apply to all such technologies. Examples of protocols in the family include, without limitation and of one or more versions, IS-95, IS-2000, UMTS, HSPA. Additionally, other technologies that use code division multiplexing may be used as well, such as 3GPP Long Term Evolution (LTE) and some revisions of 802.11.

Digital data can be communicated wirelessly by using Code Division Multiple Access (CDMA). In a typical Code Division Multiple Access (CDMA) system, a data signal may be combined with a Walsh code and a pseudo-noise (PN) sequence before the data is transmitted. Each user of a mobile device may have a uniquely assigned Walsh code and each BTS may have a unique PN sequence. Thus, each data signal may be encoded with a combination of PN code and Walsh code. In a wireless network, each wireless coverage area (e.g., a cell or sector) uses the same PN code set, but with a characteristic time offset relative to every even second in a standard time base (e.g., GPS time), as one example.

Figure 1:
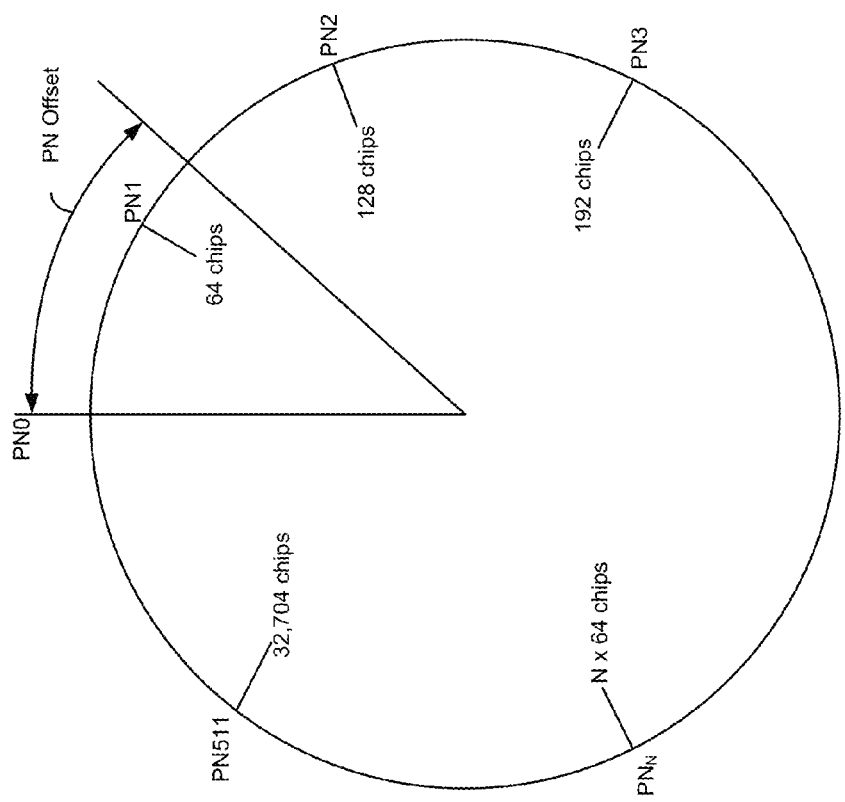
FIG. 1 is a diagram illustrating an example PN codes.

FIG. 1 is a diagram illustrating an example PN code set, which may also be called a "short code." The PN code may include a sequence of 32,767 chips ($2^{15}$ chips) which are typically transmitted at a rate of 1.2288 MHz. Thus, the short code is repeated every 26.667 milliseconds, or 75 times every 2 seconds. The PN code is time synchronized across the system and each sector may broadcast the same short code with different time offsets relative to system time. In some examples, it is a time offset that a mobile device may use to identify and distinguish sectors of the network. Particularly, a pilot signal is the code channel that the mobile may look for to find neighboring sectors while traversing the network.

With respect to FIG. 1, the PN code can be thought to traverse around the perimeter of the circle in increments being equal to one chip. The outside of the circle may be considered a PN code offset index. In the example in FIG. 1, the offsets are in increments of 64 chips to provide 512 possible offsets (shown as PN0 through PN511 in FIG. 1). In practice, a cellular wireless communications network might use only every Nth offset, where N is an integer greater than one. For example, if N=2, there would be 256 possible offsets.

1. PN CODE SELECTION SYSTEM ARCHITECTURES a. Example Architecture

Figure 2:
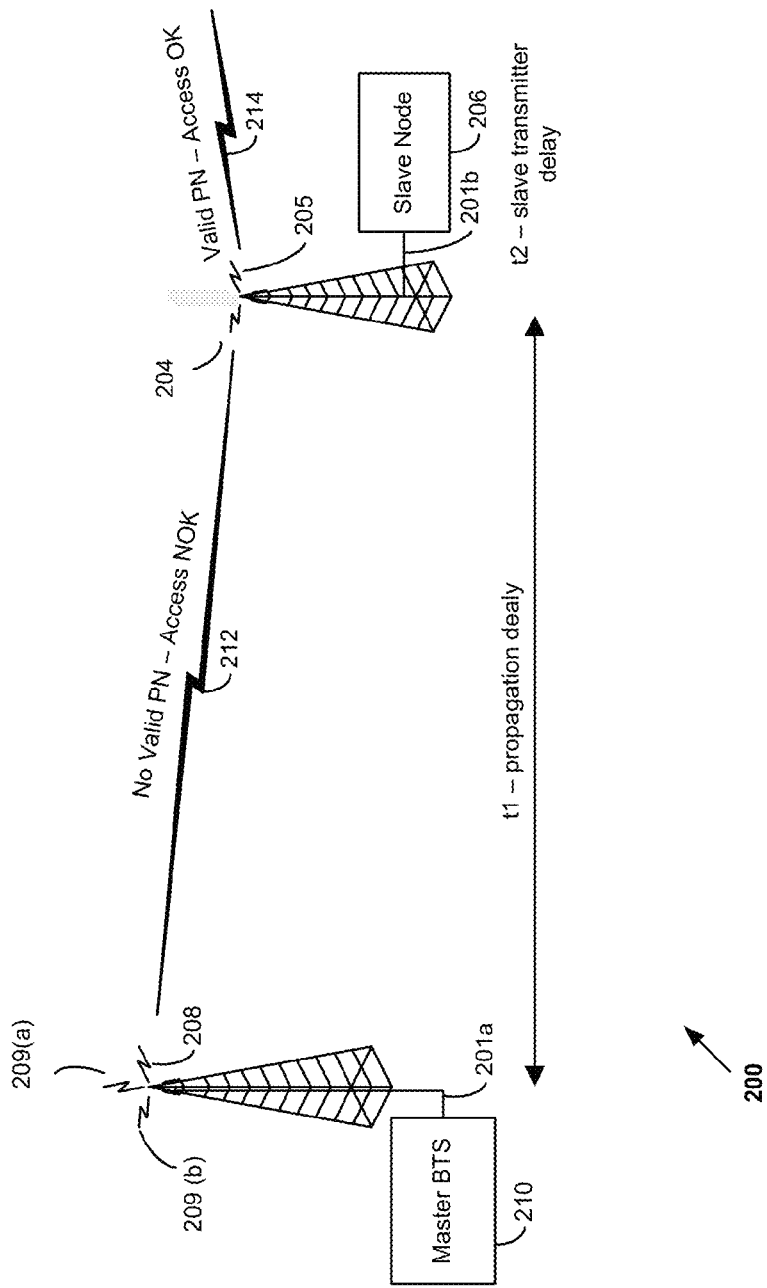
FIG. 2 illustrates a high-level view of an implementation of a PN code selection system.

A network 200 in FIG. 2 illustrates a high-level view of an implementation of a PN code selection system according to an example configuration of a standard architecture. By way of example, the PN code selection system implementation in this illustration is shown as providing a common access infrastructure with a master BTS 210 and a slave node 206. The BTS 210 is a traditional BTS, having a radio connection to an antenna 208.

In practice, a connection 201 is commonly implemented as a coaxial cable between the BTS and an RF transmission component that transmit the RF signal via antenna elements at or near the top of the tower or other structure.

The coverage areas provided by the BTS (including the transmitting antennas) are typically called cells or cell sectors. By way of example, the BTS 210 (in conjunction with the antennas 208, 209(a) and 209(b) is configured to be sectorized, such that it provides three sectors. An access device then communicates on a connection via one or more of the cells or sectors of a BTS in accordance with one or more of a family of CDMA protocols. For instance, under IS-2000, each cell or sector will be identified according to a locally unique identifier based on a bit offset within a 16-bit pseudo-random number (PN). An access device operating according to IS-2000 receives essentially the same RF signal from up to six sectors concurrently, each sector being identified and encoding transmissions according its PN code. A mobile device can communicate with a specific sector of a BTS by communicating with the PN code associated with the specific sector. If a signal is received with either an incorrect PN code or an invalid PN code, the mobile may ignore the signal.

Signals received from access devices connected via the antennas 208, 209(a) and 209(b) are transmitted back to the BTS 210. Unlike the BTS 210, which supplies the antennas 208, 209(a), and 209(b), the node 206 receives its transmission signal via an RF signal 212 through connection 201b. Connection 201b may be a coaxial connection similar to connection 201a. The amount of time for RF signal 212 to propagate from antenna 208 to reception antenna 204 is an amount equal to t1 seconds. As shown, the master BTS 210 may transmit an RF signal 212. The RF signal 212 is the same type of CDMA signal as the signal BTS 206 is using to communicate with handheld devices. However, rather than master BTS 210 supplying RF signal 212 to a handheld device, the RF signal 212 may be received by the slave node 206 with reception antenna 204.

In some embodiments, reception antenna 204 and antenna 208 may be a highly directed antenna, such as a dish antenna. The dish antenna may allow the RF signal 212 to be transmitted with a lower power level and minimize interference. In other embodiments, reception antenna 204 and antenna 208 may be a less directed antenna. The less directed antenna may allow reception antenna 204 and antenna 208 to communicate with a larger area. The methods and apparatuses presented herein may be used with different antenna types and designs to meet specific design goals.

After receiving RF signal 212 with reception antenna 204, BTS 206 may process the received signal and then transmit an RF signal 214 with service antenna 205. The time between receiving signal 212 and transmitting signal 214 may be t2 seconds. The signal processing introduced by BTS 206 may include a power amplification. For example, the signal received at reception antenna 204 may measure about −30 dBm (which is equivalent to 0.001 milliwatts). The power amplification may amplify the signal power to be similar to the transmission power from antenna 208. For example, the amplifier may provide 73 dB of amplification to the −30 dBm received RF signal 212, creating a 43 dBm (which is equivalent to 20 Watts) signal to transmit with antenna 205 as RF signal 214.

In some embodiments, RF signal 214 may be an amplified and time delayed version of RF signal 212. FIG. 3 shows a block diagram of a communication system 300 with three slave nodes 306, 308(a), and 308(b), each in communication with a master BTS 310. With respect to Figure, each node is assumed to have an associated antennas; description of the antennas is omitted. However, one should understand actual signal transmission and reception from each node may be via an antenna or system of antennas, in some examples. In addition to the slave nodes, a handset 304(c) may receive an RF signal 305(c) as transmitted directly from BTS 310.

Figure 3A:
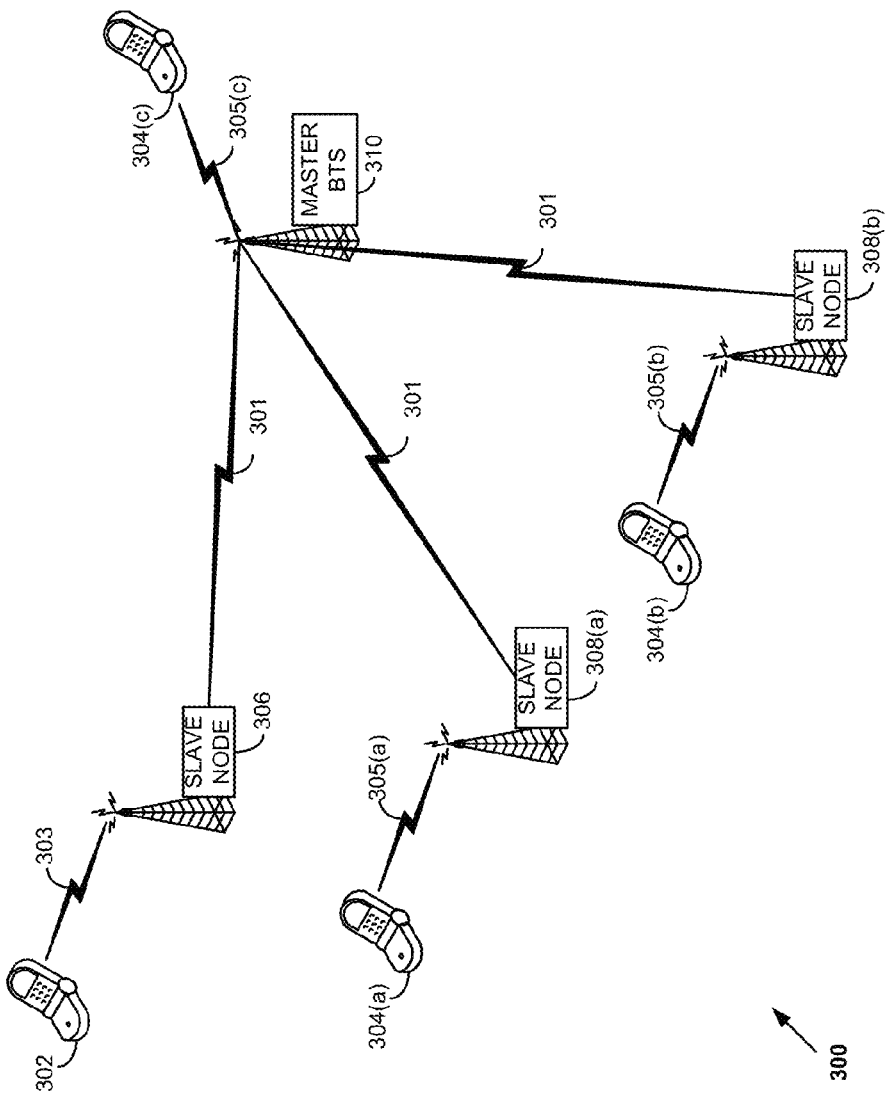
FIG. 3a shows a block diagram of a communication system 300 with three slave nodes.

Each slave node 306, 308(a), and 308(b) may receive a signal 301 transmitted by the master BTS 310 as illustrated in FIG. 3A. Although each slave node 306, 308(a), and 308(b) may receive signal 301, in one embodiment only slave node 306 may be the intended target of the data transmission. In some embodiments, each slave node 306, 308(a), and 308(b) may have an associated transmission delay time unique to each specific slave node. Each node may retransmit the signal 301 received from the master BTS after applying the time delay associated with each specific slave node. Thus, signals 303, 305(a), and 305(b) may be similar to signal 301, but each having a time delay, equivalent to (or substantially equivalent to) the time delay of the respective slave node applied.

As an example, slave node 306 may responsively transmit RF signal 303 to handset 302. When handset 302 receives signal 303, the signal 303 may have PN code that appears to be correct for a code transmitted by slave node 306. When slave node 306 introduced a time delay, the signal 303 may be transmitted with a correct PN code (explained further below in section b). Handset 302 may be a CDMA mobile phone; however, the handset may also be a laptop, PC Card in a computer, mobile hotspot, or other wireless device.

Figure 3B:
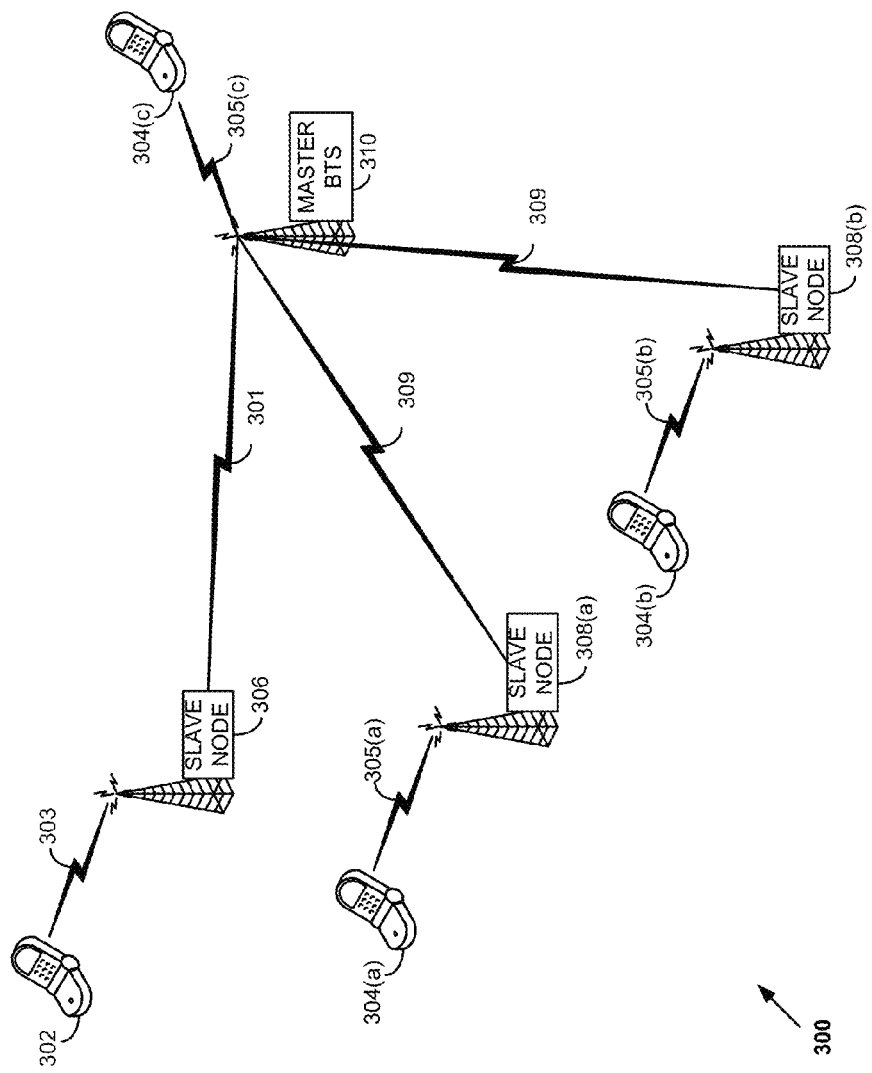
FIG. 3b shows a block diagram of a communication system 300 with three slave nodes.

Each slave node 306, 308(a), and 308(b) may receive either a signal 301 or signal 309 transmitted by the master BTS 310 as illustrated in FIG. 3B. Each slave node 306, 308(a), and 308(*b*) may receive different signals, either 301 or 309, depending on the location of the slave node. In one embodiment, slave node 306 is either in a different sector from slave nodes 308(*a*) and 308(*b*) or it is it the target of a specific antenna controlled by Master BTS 301. Thus, slave node 306 receives a different signal than slave nodes 308(*a*) and 308(*b*). Like the embodiment described with respect to FIG. 3A, each node may retransmit the signal received from the master BTS after applying the time delay associated with each specific slave node. Thus, signals 303 may be similar to signal 301 and signals 305(*a*) and 305(*b*) may be similar to signal 309, but each having a time delay, equivalent to (or substantially equivalent to) the time delay of the respective slave node applied.

Figure 3C:
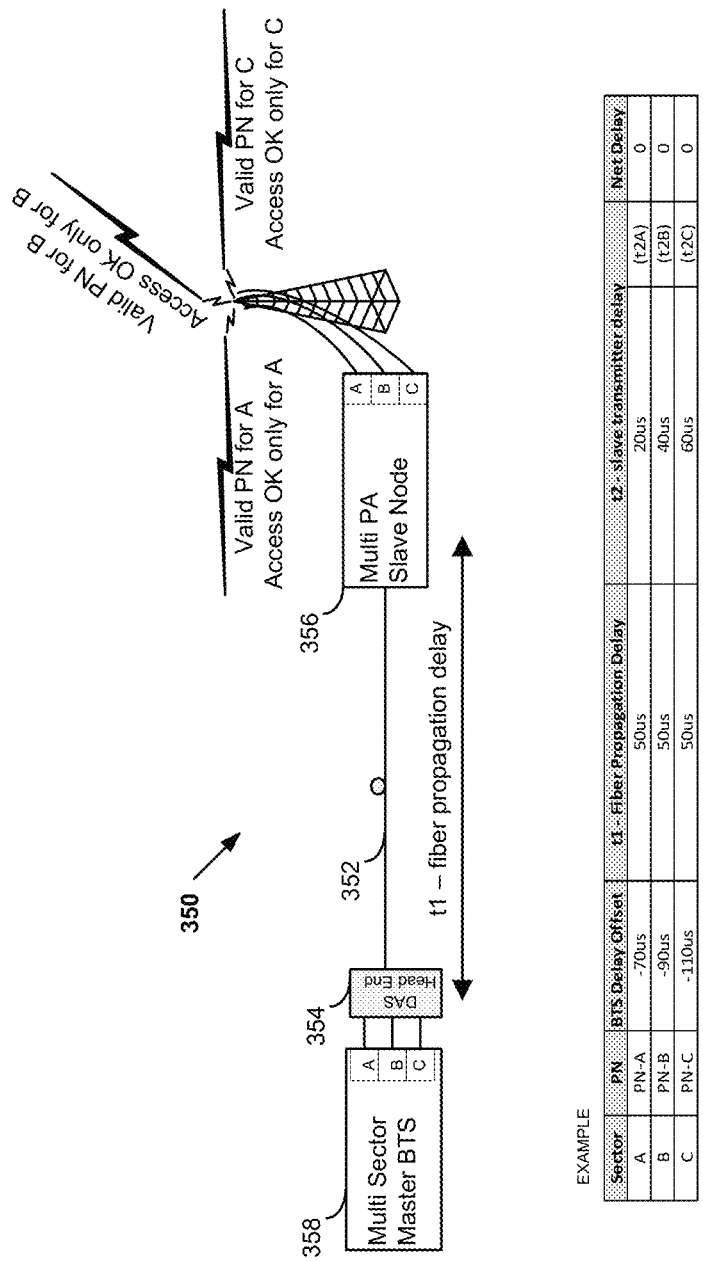
FIG. 3c shows a block diagram of a communication system 600 with a multi-slave node.

As an example, slave node 306 may responsively transmit RF signal 303 to handset 302. When handset 302 receives signal 303, the signal 303 may have PN code that appears to be correct for a code transmitted by slave node 306. When slave node 306 introduced a time delay, the signal 303 may be transmitted with a correct PN code (explained further below in section b). Handset 302 may be a CDMA mobile phone; however, the handset may also be a laptop, PC Card in a computer, mobile hotspot, or other wireless device. Transmitting different signals to the different slave nodes is not limited to the two embodiments disclosed herein. Many various combinations of signal transmission to slave nodes may be used with the methods and apparatuses disclosed herein. FIG. 3*c* illustrates an example communication system 350 with a multi-slave node based on the methods of PN selection as disclosed herein. System 350 has a fiber optic backhaul connection 352 with an associated time delay of t1, here measured in microseconds (um). In one embodiment, the fiber optic backhaul 352 connects a DAS Head End 354 with a Multi-PA Slave Node 356. The DAS Head End 354 may receive a number of signals from a Multi-Sector Master BTS 358. In the example shown in FIG. 3C, Multi-Sector Master BTS 358 provides signals A, B, and C to the DAS Head End 354. The DAS Head End 354 combines the signals for transmission down the fiber optic 352.

The Multi-PA Slave Node 356 is configured to receive and separate signals A, B, and C received from the fiber optic 352. The Multi-PA Slave Node 356 also applies a signal delay to each of the respective signals. Signal A has an associated delay of t2A, Signal B has an associated delay of t2B, and Signal C has an associated delay of t2C, each measured in microseconds (um). Multi-PA Slave Node 356 may additionally contain a power amplifier. Each signal may be amplified before transmission. An antenna, similar to the antennas described with respect to other embodiments, transmits signals A, B, and C.

The Multi-Sector Master BTS 358 applies a pre-distortion to the PN code of each signal, equivalent to the propagation delay t1 of the fiber optic 352 and the transmitter delay for the respective signal at Multi-PA Slave Node 356. Thus, the signals transmitted may have a PN code that has no apparent delay. FIG. 3C presents system 350 that is similar to system 200 of FIG. 2; however, the backhaul of FIG. 3C is a fiber optic line rather than a radio frequency link.

b. PN Code Selection System Function

Figure 4:
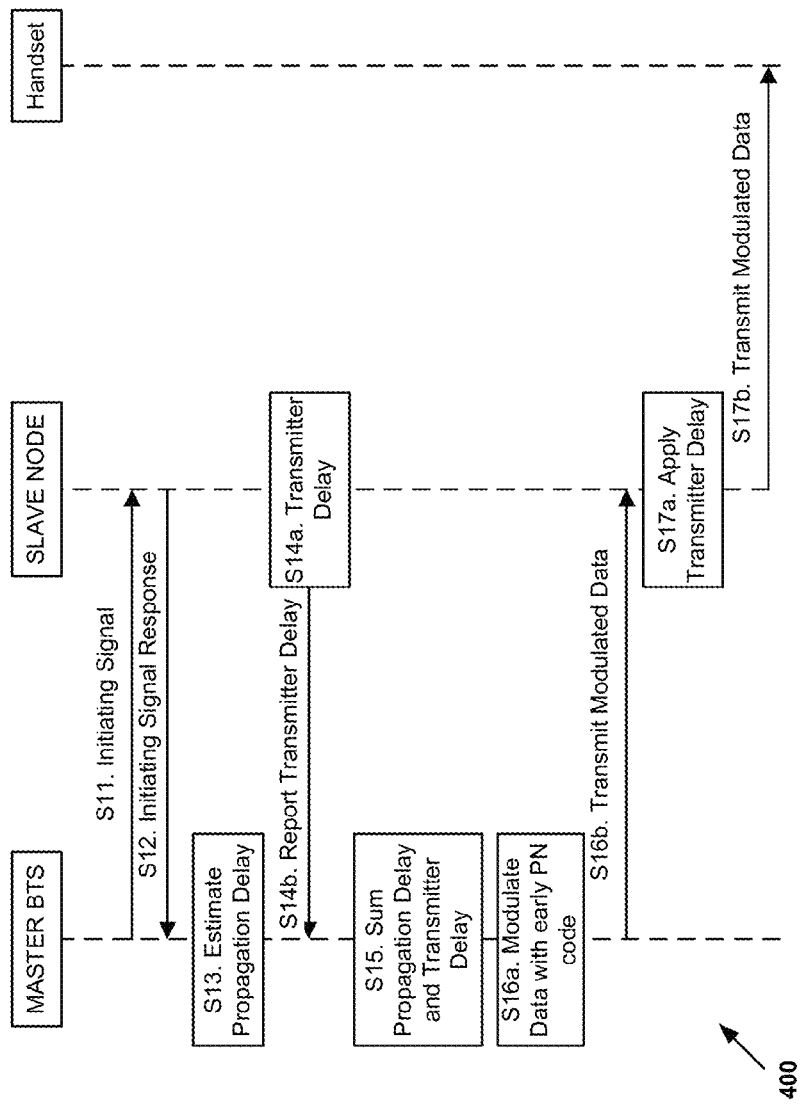
FIG. 4 illustrates an example system function of PN selection.

FIG. 4 illustrates an example system function of PN selection as disclosed herein. The system function 400 for PN selection may include a Master BTS, a slave node, and a mobile handset. Some examples of method 400 may be performed by the example network 300 show in FIG. 3 or other network configurations. Although the blocks of method 400 are illustrated in a sequential order, these blocks may also be performed in parallel, and/or in a different order than those described herein. Also, the various blocks may be combined into fewer blocks, divided into additional blocks, and/or eliminated based upon the desired implementation.

The method 400 may begin with Master BTS transmitting an initiation signal S11 to the save Node. Responsive to receiving initiation signal S11, the slave node may send an initiation signal response S12 to the Master BTS. The Master BTS may be configured to measure the amount of time between the transmissions of the initiation signal S11 and the reception of the initiation signal response S12. Based on the measured time, the Master BTS may estimate a propagation delay at S13. The propagation delay may be equivalent to or associated with the amount of time it takes an RF signal to propagate from the Master BTS to the slave node.

The propagation delay time may be estimated in a variety of ways. For example, the Master BTS may divide the amount of time between the transmissions of the initiation signal S11 and the reception of the initiation signal response S12 by two. In other embodiments, the slave node may respond and include information indicating an amount of time that it took to process initiation signal S11. In this embodiment, the Master BTS may divide the amount of time by two after subtracting the processing time. In further embodiments, the initiation signal response S12 may include a known value equivalent to the propagation delay time. The propagation delay may have been previously measured and the slave node may report the known value. In additional embodiments, the propagation delay time may be programmed in a memory of the Master BTS and may not be measured as a part of normal operation.

The slave node may also have an associated transmitter delay S14*a*. The transmitter delay may be equivalent to the amount of time it takes for a received signal to be processed and retransmitted by the slave node. The slave node may report the transmitter delay to the master node at S14*b*. The master BTS may store the transmitter delay, along with the propagation delay, in a memory. The master BTS may sum the transmitter delay and the propagation delay at S15. This summed value may be equivalent to (or substantially equivalent to) the amount of time it takes for: (i) an RF signal to propagate from the master BTS to the slave node, (ii) the slave node to receive and process the signal, and (iii) the slave node start transmission of a signal.

The master BTS may modulate data with a with an early PN code at S16*a*. The master BTS may modulate the data with PN code that has been advanced an amount equivalent to the summed transmitter delay and the propagation delay from S15. For example, assuming the summed total delay time is 6.66675 milliseconds, the data would be modulated with a PN code that is 128 codes earlier than the desired PN code. Because each PN code is sequence of 32,767 chips which are transmitted at a rate of 1.2288 MHz, the short code is repeated every 26.667 milliseconds. The time of the propagation delay in the example is equal to one fourth of the time duration of the PN code. In order to compensate for the delay, the data may be modulated to factor in the delay, hence the PN code is transmitted 128 codes earlier (i.e. 512 divided by 4). Transmitting 128 codes earlier is merely an example, the delay compensation amount may be any number of PN code indices earlier. In some embodiments, the transmission may not be an integer value of PN codes, thus a fractional value may be used.

Once the data has been modulated, the modulated data may be transmitted as an RF signal with the master BTS at S16*b*. The master BTS may transmit the data through an antenna that part of the master BTS system. The RF signal may propagate through the air (or other transmission medium) to reach a slave node. The RF signal may propagate through the air as shown as 212 of FIG. 2. While the signal is propagating, the signal may have a PN code that appears invalid. The code may appear invalid due to timing offset applied as an early PN code at S16a. Because the PN code appears invalid, the mobile device may not receive network access with RF signal 212. As shown in the example in FIG. 2, access is not allowed on signal 212 ("access NOK"). From the mobile device's perspective, it may see an RF signal, but based the incorrect PN code, the mobile may ignore the signal.

The slave node may receive the modulated signal with an antenna. Once the signal has been received by the slave node, the slave node may apply a fixed transmitter delay at S17a. The fixed transmitter delay may be due to (i) signal processing elements in the slave node, (ii) a time delay in the slave node, or (iii) a combination of signal processing elements and time delay. The signal processing in the slave node may be similar to the signal processing discussed above with respect to BTS 206 in FIG. 2.

After the transmitter delay was applied in S17a, the slave node may transmit the modulated data at S17b. The modulated may be amplified by the slave node. The slave node may transmit signals with an output power approximately equal to the standard output power of a cellular base station (for example, 20 Watts). The modulated data may be transmitted with an antenna that part of the slave node system. The transmitted data may propagate through the air as an RF signal shown as 214 of FIG. 2.

While the signal is propagating, the signal may have a PN code that appears valid. The code may appear valid due to timing offset applied as an early PN code at S16a being equivalent to the propagation time of signal 212 and the delay introduced in the slave node. Because the PN code appears valid, the mobile device may receive network access with RF signal 214. As shown in FIG. 2, access is allowed on 214 ("access OK"). From the mobile device's perspective, it may see an RF signal with a correct PN code, the mobile may receive the signal.

The modulated data transmitted at S17b may be received by a handset. The handset may be configured to search for a specific PN code. Thus, the data that was modulated with an early PN code at S16a, would appear to have the correct PN code when the propagation delay and transmitter delay were factored in. From the point of view of the handset, the modulated data would appear to have originated at the slave node.

c. PN Selection Method

Figure 5:
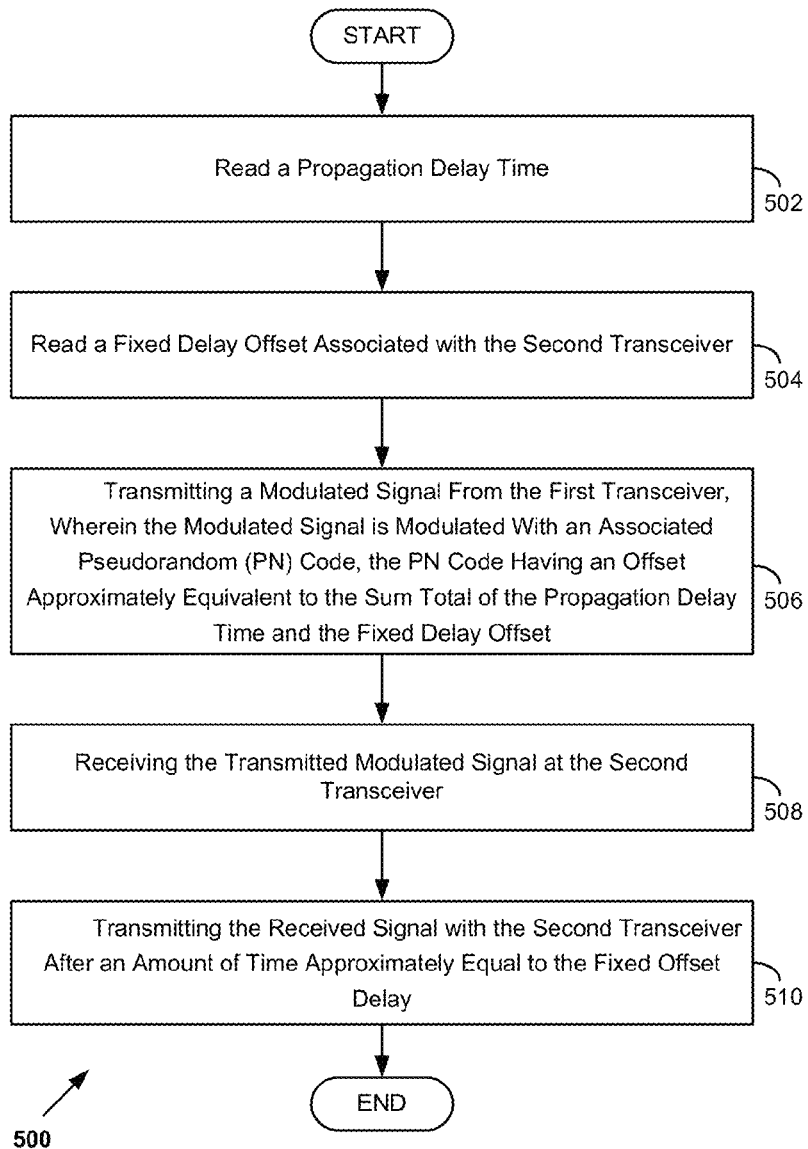
FIG. 5 illustrates an example method of PN selection as disclosed herein.

FIG. 5 illustrates an example method of PN selection as disclosed herein. Although the blocks of method 500 are illustrated in a sequential order, these blocks may also be performed in parallel, and/or in a different order than those described herein. Also, the various blocks may be combined into fewer blocks, divided into additional blocks, and/or eliminated based upon the desired implementation. In addition, for the method 500, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM), or long periods of time.

The method 500 may begin with block 502 where the system reads a propagation delay time. The propagation delay time may be stored in a memory that is part of the Master BTS. In some embodiments, the system may measure the propagation delay time as disclosed with respect to FIG. 4 above. In other embodiments, the propagation delay time may be calculated mathematically and stored in the memory.

At block 504, the method may be executed to read a fixed delay time associated with second transmitter from a memory. The fixed delay time may be transmitted to the master BTS from a second transmitter. Additionally, in some embodiments, the fixed delay time may be programmed into the memory of the master BTS.

Once a fixed delay and propagation delay are known, they can be added together to form the sum total delay. At block 506, the master BTS may transmit a modulated signal, where the modulated signal is modulated with an associated Pseudorandom (PN) code. The PN code may have an offset approximately equivalent to the sum total of the propagation delay time and the fixed delay offset. The PN code may be offset in a way such that after a period time equal to the sum of the fixed delay and the propagation delay, the PN code has advanced to the desired code.

The transmitted modulated signal may be received by a second transceiver at block 508. The second transceiver may be the slave node. The second transceiver may have an associated signal processing capability and associated time delay. At block 510, the second transceiver may transmit the received signal after an amount of time approximately equal to the fixed offset delay. In some embodiments, the signal transmitted by the second transceiver has a PN code that has timing to make the signal appear to have been originally transmitted from the second transceiver.

d. Associated Computing Device

Figure 6:
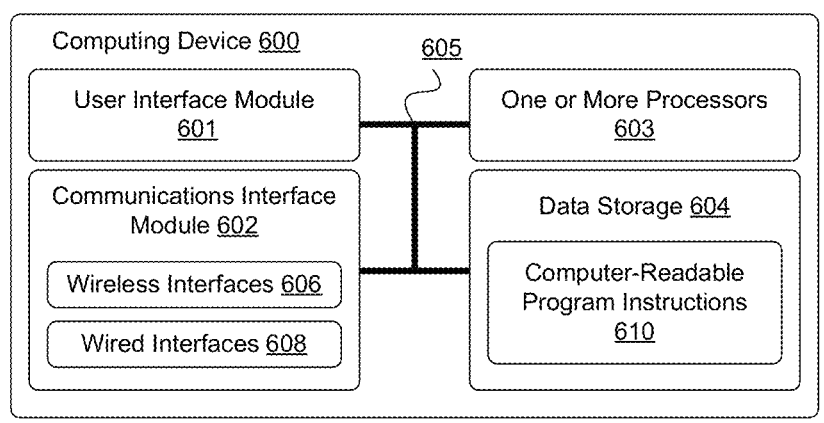
FIG. 6 is a block diagram of a computing device 600 in accordance with an example embodiment.

FIG. 6 is a block diagram of a computing device 600 in accordance with an example embodiment. The computing device 600 may be a component of one or more of the BTSs. The computing device 600 can include a user interface module 601, a network-communication interface module 602, one or more processors 603, and data storage 604, all of which can be linked together via a system bus, network, or other connection mechanism 605.

The user interface module 601 can be operable to send data to and/or receive data from external user input/output devices. For example, the user interface module 601 can be configured to send/receive data to/from user input devices such as a keyboard, a keypad, a touch screen, a computer mouse, a track ball, a joystick, and/or other similar devices, now known or later developed. The user interface module 601 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 601 can also be configured to generate audible output(s), such as a speaker, speaker jack, audio output port, audio output device, earphones, and/or other similar devices, now known or later developed. The user interface module 601 may be used to enter data for use with the methods and systems disclosed herein.

The network-communications interface module 602 can include one or more wireless interfaces 606 and/or wireline interfaces 608 that are configurable to communicate via a network, such as the network 300 shown in FIG. 3. The wireless interfaces 606 can include one or more wireless transceivers, such as a Bluetooth transceiver, a Wi-Fi transceiver perhaps operating in accordance with an IEEE 802.11 standard (e.g., 802.11a, 802.11b, 802.11g), a WiMax™ transceiver perhaps operating in accordance with an IEEE 802.16 standard, and/or other types of wireless transceivers configurable to communicate via a wireless network. Additionally, the wireless interfaces 606 may be a cellular communication interface, such as CDMA, GSM, WCDMA, EDGE, HSPA, or other cellular communication standard. The wireline interfaces 608 can include one or more wireline transceivers, such as an Ethernet transceiver, a Universal Serial Bus (USB) transceiver, or similar transceiver configurable to communicate via a wire, a twisted pair of wires, a coaxial cable, an optical link, a fiber-optic link, or other physical connection to a wireline network.

In some embodiments, the network communications interface module 602 can be configured to provide reliable, secured, compressed, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be compressed and decompressed using one or more compression and/or decompression algorithms and/or protocols such as, but not limited to, one or more lossless data compression algorithms and/or one or more lossy data compression algorithms. Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. The network communications interface module 602 may also be able to encode data in a CDMA system based on Walsh Codes and PN Codes. Other cryptographic protocols and/or algorithms can be used as well or in addition to those listed herein to secure (and then decrypt/decode) communications.

The one or more processors 603 can include one or more general purpose processors and/or one or more special purpose processors (e.g., digital signal processors, application specific integrated circuits, etc.). The one or more processors 603 can be configured to execute computer-readable program instructions 610 that are contained in the data storage 604 and/or other instructions as described herein.

The data storage 604 can include one or more computer-readable storage media that can be read or accessed by at least one of the processors 603. The one or more computer-readable storage media can include volatile and/or non-volatile storage components, such as optical, magnetic, organic or other memory or disc storage, which can be integrated in whole or in part with at least one of the one or more processors 603. In some embodiments, the data storage 604 can be implemented using a single physical device (e.g., one optical, magnetic, organic or other memory or disc storage unit), while in other embodiments, the data storage 604 can be implemented using two or more physical devices.

Computer-readable storage media associated with data storage 604 and/or other computer-readable media described herein can also include non-transitory computer-readable media such as computer-readable media that stores data for short periods of time like register memory, processor cache, and random access memory (RAM). Computer-readable storage media associated with data storage 604 and/or other computer-readable media described herein can also include non-transitory computer readable media that stores program code and/or data for longer periods of time, such as secondary or persistent long term storage, like read only memory (ROM), optical or magnetic disks, compact-disc read only memory (CD-ROM), for example. Computer-readable storage media associated with data storage 604 and/or other computer-readable media described herein can also be any other volatile or non-volatile storage systems. Computer-readable storage media associated with data storage 604 and/or other computer-readable media described herein can be considered computer readable storage media for example, or a tangible storage device.

The data storage 604 can include computer-readable program instructions 610 and perhaps additional data. In some embodiments, the data storage 604 can additionally include storage required to perform at least part of the herein-described techniques, methods, and/or at least part of the functionality of the herein-described devices and networks.

2. CONCLUSION

An example of an embodiment of the present invention has been described above. Those skilled in the art will understand, however, that changes and modifications may be made to the embodiment described without departing from the true scope of the invention, which is defined by the claims.

I claim:

1. A method comprising:
    reading from memory a propagation delay time, wherein the propagation delay time is indicative of a propagation delay from a first transmitter to a second transmitter;
    reading from memory a fixed delay offset associated with the second transmitter, wherein the fixed delay offset is representative of an amount of time between the second transmitter (i) receiving a signal and (ii) starting a transmission of a signal, and wherein the fixed delay offset is based on at least one of (i) signal processing elements in the second transmitter or (ii) a time delay in the second transmitter; and
    transmitting a modulated signal from the first transmitter, wherein the modulated signal is modulated with an associated code, the associated code having an offset corresponding to a sum of the propagation delay time and the fixed delay offset.

2. The method of claim 1, wherein the offset of the associated code is measured in discrete time units, the method further comprising:
    receiving the transmitted modulated signal at the second transmitter; and
    transmitting the received signal with the second transmitter after an amount of time equal to a number of discrete time units as close as possible to the fixed delay offset, wherein the fixed delay offset associated with the second transmitter corresponds to an amount of time between receiving the transmitted modulated signal and transmitting the received signal.

3. The method of claim 1, further comprising:
    sending an initiating signal to the second transmitter with the first transmitter;
    receiving an initiating signal response from the second transmitter with the first transmitter; and,
    calculating the propagation delay time with a processor.

4. The method of claim 1, wherein the modulated signal includes a code-division multiple access signal.

5. The method of claim 1, wherein the associated code includes a pseudorandom code.

6. The method of claim 1, wherein the propagation delay time is based on radio propagation speed and a distance between the first transmitter and the second transmitter.

7. The method of claim 1, wherein the first transmitter is configured to transmit in a first frequency band and the second transmitter is configured to transmit in a second frequency band.

8. The method of claim 7, wherein the first frequency band and the second frequency band are the same frequency band.

9. The method of claim 7, wherein the first frequency band and the second frequency band are different non-overlapping frequency bands.

10. A system comprising:
a first base station transceiver, configured to:
read from memory a propagation delay time, wherein the propagation delay time corresponds to a radio propagation time from a first transmitter to a second transmitter;
read from memory a fixed delay offset associated with the second transmitter, wherein the fixed delay offset is representative of an amount of time between the second transmitter (i) receiving a signal and (ii) starting a transmission of a signal, and wherein the fixed delay offset is based on at least one of (i) signal processing elements in the second transmitter or (ii) a time delay in the second transmitter; and,
transmit a modulated signal from the first transmitter, wherein the modulated signal is modulated with an associated code, the associated code having an offset corresponding to a sum of the propagation delay time and the fixed delay offset.

11. The system of claim 10, wherein the offset of the associated code is measured in discrete time units, the system further comprising:
a second base station transceiver, the second base station transceiver configured to:
receive the transmitted modulated signal at the second transmitter; and
transmit the received signal with the second transmitter after an amount of time equal to a number of discrete time units as close as possible to the fixed delay offset, wherein the fixed delay offset associated with the second transmitter corresponds to an amount of time between receiving the transmitted modulated signal and transmitting the received signal.

12. The system of claim 10, wherein:
the first base station transceiver is further configured to send an initiating signal to the second transmitter;
the first base station transceiver is further configured to receive an initiating signal response from the second transmitter with the first transmitter; and,
the first base station transceiver comprises a processor configured to calculate the propagation delay time.

13. The system of claim 10, wherein the modulated signal includes a code-division multiple access signal.

14. The system of claim 10, wherein the associated code is a pseudorandom code.

15. The system of claim 10, wherein the propagation delay time is based on radio propagation speed and a distance between the first transmitter and the second transmitter.

16. The system of claim 10, wherein the first transmitter is configured to transmit in a first frequency band and the second transmitter is configured to transmit in a second frequency band.

17. The system of claim 16, wherein the first frequency band and the second frequency band are the same frequency band.

18. The system of claim 16, wherein the first frequency band and the second frequency band are different non-overlapping frequency bands.

19. An article of manufacture including a non-transitory computer-readable medium, having stored thereon program instructions that, if executed by an computing device, cause the computing device to perform operations comprising:
reading a propagation delay time from a first transmitter to a second transmitter;
reading a fixed delay offset associated with the second transmitter, wherein the fixed delay offset is representative of an amount of time between the second transmitter (i) receiving a signal and (ii) starting a transmission of a signal, and wherein the fixed delay offset is based on at least one of (i) signal processing elements in the second transmitter or (ii) a time delay in the second transmitter; and
initiating a transmission of a modulated signal from the first transmitter, wherein the modulated signal is modulated with an associated code having an offset corresponding to a sum total of the propagation delay time and the fixed delay offset.

20. The article of manufacture of claim 19, further comprising instructions that if executed by the computing device cause the computing device to perform operations comprising:
sending an initiating signal to the second transmitter with the first transmitter;
receiving an initiating signal response with the first transmitter; and,
calculating the propagation delay time.

21. The article of manufacture of claim 19, wherein the modulated signal includes a code-division multiple access signal.

22. The article of manufacture of claim 19, wherein the associated code is a pseudorandom code.

23. The article of manufacture of claim 19, wherein the propagation delay time is based on radio propagation speed and a distance between the first transmitter and the second transmitter.

24. The article of manufacture of claim 19, wherein the first transmitter is configured to transmit in a first frequency band and the second transmitter is configured to transmit in a second frequency band.

25. The article of manufacture of claim 24, wherein the first frequency band and the second frequency band are the same frequency band.

26. The article of manufacture of claim 24, wherein the first frequency band and the second frequency band are different non-overlapping frequency bands.

* * * * *